United States Patent Office 2,742,460
Patented Apr. 17, 1956

2,742,460

SUBSTITUTED PIPERIDINOPROPANE SALT OF PENICILLIN

Hubert W. Murphy and Verlin C. Stephens, Indianapolis, Ind., assignors to Eli Lilly and Company, Indianapolis, Ind., a corporation of Indiana No Drawing. Application October 1, 1954,
Serial No. 459,838

3 Claims. (Cl. 260—239.1)

This invention relates to a novel therapeutic compound and more particularly to a novel salt having therapeutic utility.

Our novel salt comprises the 1-benzamido-1-phenyl-3-piperidinopropane salt of penicillin, and can be represented by the following formula:

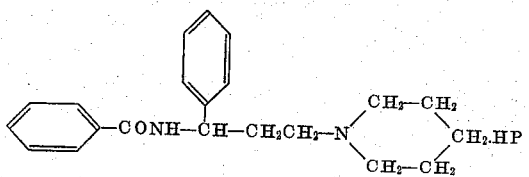

wherein HP represents the acidic form of penicillin.

Our novel chemical compound represented above can be prepared by the chemical reactions of neutralization or metathesis. Thus, for example, the acidic form of penicillin can be neutralized by the base, 1-benzamido-1-phenyl-3-piperidinopropane, or a metallic or a metalloid salt of penicillin can be reacted with an acid addition salt of 1-benzamido-1-phenyl-3-piperidinopropane. Reactions such as the above are carried out in a solvent in which all of the chemical components except the 1-benzamido-1-phenyl-3-piperidinopropane salt of penicillin are soluble, thus providing for ready isolation of that substance.

As used herein, the term "penicillin" is employed in its generic sense as inclusive of the several penicillins produced by mold growth processes. Thus, by that term we include both the natural penicillins, for example, penicillin G, penicillin F, penicillin X, etc., and the biosynthetic penicillins, for example, penicillin O, penicillin V, etc.

Our novel salt has several fields of utility. It is characterized by an ability to produce a local anesthesia of extremely long duration. Illustratively, the 1-benzamido-1-phenyl-3-piperidinopropane salt of penicillin G when employed for infiltration anesthesia in the form of a solution in a pharmaceutically acceptable solvent can produce an anesthesia of from 5 to 7 days duration. Our novel salt is also characterized by an ability to produce a therapeutically effective blood level of penicillin for a prolonged period of time. Illustratively, the intramuscular administration of an aqueous suspension of finely divided 1-benzamido-1-phenyl-3-piperidinopropane salt of penicillin G, in the amount of about 300,000 units of penicillin activity, will generally provide a therapeutically effective blood level of penicillin for as long as 48 hours. Injection of a suspension of 600,000 units will provide in most instances effective blood levels of 72 or even 96 hours duration. Additionally, the very low solubility of the 1-benzamido-1-phenyl-3-piperidinopropane salt of penicillin provides a convenient and simple means of separating penicillin from aqueous solutions thereof. For example, the solubility in water of the 1-benzamido-1-phenyl-3-piperidinopropane salt of penicillin G is only about 0.15 per cent, thereby affording nearly quantitative recovery of penicillin G when precipitated as that salt. As is to be expected, the solubilities of the 1-benzamido-1-phenyl-3-piperidinopropane salt of different penicillins will vary to some extent, but in general the solubilities are of the same order of magnitude as is the solubility given above for the 1-benzamido-1-phenyl-3-piperidinopropane salt of penicillin G.

For the sake of convenience, the illustrations given above which set forth the several aspects of our invention have been drawn with respect to penicillin G (benzyl penicillin). Also for convenience, the following examples will generally be drawn with respect to penicillin G. However, it is to be understood that our invention is not limited to that particular penicillin.

The following examples illustrate methods of producing the novel penicillin salt of this invention:

EXAMPLE 1

*Penicillin G salt of 1-benzamido-1-phenyl-3-piperidinopropane*

To 2 g. of the potassium salt of penicillin G dissolved in 5 ml. of water is added a solution of 1.8 g. of 1-benzamido-1-phenyl-3-piperidinopropane hydrochloride. The solutions are thoroughly mixed and the mixture is cooled. An oil separates which crystallizes slowly on standing in a refrigerator. Crystallization can be speeded up somewhat by occasionally scratching the side of the container holding the mixture with a glass rod. The resulting crystals of the 1-benzamido-1-phenyl-3-piperidinopropane salt of penicillin G are filtered off, are washed with distilled water, and dried in air.

EXAMPLE 2

*Penicillin G salt of 1-benzamido-1-phenyl-3-piperidinopropane*

9 g. of 1-benzamido-1-phenyl-3-piperidinopropane hydrochloride are dissolved in 180 ml. of distilled water. The solution is filtered and 10 g. of sodium penicillin G dissolved in 25 ml. of distilled water are added with stirring. Seed crystals of the penicillin G salt of 1-benzamido-1-phenyl-3-piperidinopropane from a previous preparation are added to prevent the separation of the compound as an oil. The crystals of the penicillin G salt of 1-benzamido-1-phenyl-3-piperidinopropane which separate are collected in a Buchner funnel and are washed with 50 ml. of cold distilled water. The crystalline salt is first air-dried in a dust-free room, and is then dried in vacuo over anhydrous calcium chloride for 48 hours. The yield of penicillin G salt of 1-benzamido-1-phenyl-3-piperidinopropane is about 16 g. or 97.5 per cent of theory based on the amount of penicillin G used. The crystals have no definite melting point but gradually decompose on heating. The solubility of the salt in water is approximately 1.5 mg./ml. The antibiotic potency of the compound as determined microbiologically is about 978 Oxford units/mg. The LD$_{50}$ of the material is about 4279±179 mg./kg. when injected subcutaneously into rats. (The LD$_{50}$ of 1-benzamido-1-phenyl-3-piperidinopropane hydrochloride has been found to be about 112 mg./kg. when administered to rats subcutaneously.)

EXAMPLE 3

*Preparation of penicillin V salt of 1-benzamido-1-phenyl-3-piperidinopropane*

3.5 g. of 1-benzamido-1-phenyl-3-piperidinopropane hydrochloride are dissolved in water. To this solution are added 3.5 g. of penicillin V (phenoxymethylpenicillin) dissolved in dilute potassium carbonate solution. Seed crystals of the 1-benzamido-1-phenyl-3-piperidinopropane salt of penicillin V are added to the penicillin V solution, and the solution of 1-benzamido-1-phenyl-3-piperidinopropane hydrochloride is added immediately thereto. The resulting crystals of the penicillin V salt of 1-benzamido-1-phenyl-3-piperidinopropane are filtered, are washed with cold water and are then air-dried in a dust-free room. The yield is about 95 per cent of theory. The penicillin V salt of 1-benzamido-1-phenyl-3-piperidinopropane is somewhat more soluble in water than the corresponding penicillin G salt, having a solubility of about 6.13 mg./ml. of water.

EXAMPLE 4

Precipitation of penicillin G

To 10 l. of an aqueous solution of crude potassium penicillin G (200,000 units/ml.), such as is obtained in the course of the commercial preparation of penicillin from a mold growth culture medium, are added 15 l. of an aqueous solution of 1125 g. of 1-benzamido-1-phenyl-3-piperidinopropane hydrochloride containing seed crystals of the penicillin G salt of 1-benzamido-1-phenyl-3-piperidinopropane. The solution is cooled to about 0° C. and is stirred until precipitation is complete and any oily precipitate has become crystalline. The crystalline penicillin G salt of 1-benzamido-1-phenyl-3-piperidinopropane is then isolated by filtration.

For the use of our novel salt as a means of inducing a prolonged anesthesia, the salt preferably is employed in solution. For the preparation of the solution, a solvent such as aqueous polyethylene glycol 200 can be employed. Illustratively, a solution suitable for therapeutic purposes to provide a long-lasting anesthetic effect can be obtained by dissolving under sterile conditions 0.045 g. of the 1-benzamido-1-phenyl-3-piperidinopropane salt of penicillin G in 1 ml. of 70 per cent aqueous polyethylene glycol 200. Preferably, the mixture is warmed slightly prior to use to assure the complete solution of the salt. Suspensions containing 1 or 2 percent of the 1-benzamido-1-phenyl-3-piperidinopropane salt of penicillin G are also effective in producing a long-lasting anesthetic effect.

Further by way of illustration, an aqueous medicinal preparation which, upon intramuscular injection, is capable of maintaining a prolonged therapeutically effective blood level of penicillin, comprises a suspension containing from about 300 to about 700 mg. of the finely divided penicillin G salt of 1-benzamido-1-phenyl-3-piperidinopropane per ml. of suspension. The suspending medium can be either water or a vegetable oil or other parenterally acceptable media such as diethyl carbonate. Intramuscular administration of 1 ml. of the above type of suspension will provide, in most cases, a therapeutically effective penicillin blood level of about 48 to 96 hours duration, depending upon the concentration and amount of suspension administered.

The above mentioned medicinal preparations are given by way of illustration only, and it will be apparent to those skilled in the art that there may be prepared numerous modifications and variations of the above medicinal compositions. Thus, for example, in place of the aqueous polyethylene glycol 200 employed as a solvent, other suitable solvents such as aqueous polyethylene glycol 300, aqueous polyethylene glycol 400, aqueous polypropylene glycol 250, and the like can be employed as well as other solvents suitable for parenteral use.

It will also be understood that other therapeutically effective ingredients can be incorporated into medicinal compositions containing our novel salt. Furthermore, the composition containing our novel salt can have incorporated therein suspending agents, surface-active agents and the like, which are now employed in suspensions of procaine penicillin.

For the purpose of convenience, the preparation of 1-benzamido-1-phenyl-3-piperidinopropane hydrochloride is given below:

A mixture of 101.5 g. of β-piperidinopropiophenone hydrochloride, prepared by the method of Adams, Organic Reactions 1, 329, (1942), 31.4 g. of hydroxylamine hydrochloride, 33.6 g. of sodium bicarbonate and 200 ml. of water was allowed to stand at room temperature overnight. A solution of 43 g. of sodium hydroxide in 43 ml. of water was added to the reaction mixture and after cooling, the precipitated β-piperidinopropiophenone oxime was removed by filtration. After recrystallization from methanol, the β-piperidinopropiophenone oxime melted at 152–153° C.

A mixture of 10 g. of Raney nickel catalyst, 81.5 g. of β-piperidinopropiophenone oxime, 200 ml. of ethanol and 75 ml. of liquid ammonia was placed in an autoclave, and was hydrogenated at 1400 lbs. pressure for one hour at 70 to 110° C. The reaction mixture was filtered to remove the catalyst and the filtrate was fractionally distilled under reduced pressure. The 1-phenyl-3-piperidinopropylamine formed in the reaction distilled at 133–134° C. at a pressure of 1 mm. of mercury.

A mixture of 24 g. of 1-phenyl-3-piperidinopropylamine, 24 ml. of benzoyl chloride, 300 ml. of benzene and 45 ml. of dry pyridine was allowed to stand at room temperature for about sixteen hours. A sufficient amount of ethyl ether was then added to bring about complete precipitation of the 1-benzamido-1-phenyl-3-piperidinopropane hydrochloride which was formed in the reaction. The precipitate was removed by filtration and was purified by recrystallization from a mixture of isopropanol and ether. The 1-benzamido-1-phenyl-3-piperidinopropane hydrochloride thus prepared melted at about 188–189° C.

From the above salt, the free base can be obtained by treating an aqueous solution of the salt with an equivalent of alkali, and isolating the free base which separates from the solution. The free base can then be crystallized.

We claim:

1. A novel salt represented by the following formula

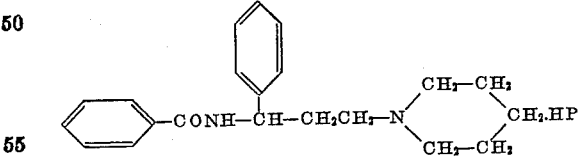

wherein HP represents the acidic form of penicillin.

2. A compound according to claim 1 wherein the penicillin is penicillin G.

3. A compound according to claim 1 wherein the penicillin is penicillin V.

No references cited.